United States Patent [19]

Ide

[11] Patent Number: 4,877,257
[45] Date of Patent: Oct. 31, 1989

[54] PISTON RING

[76] Inventor: Russell D. Ide, 28 Daniel Dr., Coventry, R.I. 02816

[21] Appl. No.: 295,002

[22] Filed: Jan. 6, 1989

Related U.S. Application Data

[63] Continuation of Ser. No. 86,873, Aug. 19, 1987, abandoned.

[51] Int. Cl.$^4$ .......................... F16J 15/32; F02F 75/06
[52] U.S. Cl. ............................... 277/206 A; 123/193 P
[58] Field of Search ....................... 277/206 A, 58, 152, 277/158, 160, 165, 138, 205, 216; 123/193 P

[56] References Cited

U.S. PATENT DOCUMENTS

| | | | |
|---|---|---|---|
| 2,657,961 | 11/1953 | Lassberg | 123/193 P X |
| 3,612,551 | 10/1971 | Grabill | 277/206 A X |
| 4,582,330 | 4/1986 | Lew et al. | 277/206 A |
| 4,672,931 | 6/1987 | Biagini | 123/193 P |
| 4,676,668 | 6/1987 | Ide | 384/117 |

Primary Examiner—Donald A. Griffin
Attorney, Agent, or Firm—Kenyon & Kenyon

[57] ABSTRACT

A piston ring which consists of a sealing member supported by a flexible support structrue that deflects under applied loads to cause improved sealing and reduced wear. The support structure is constructed to react the applied loads such that the sealing member moves toward the cylinder wall to improve sealing and lower frictional drag and wear. Under operating loads, the sealing surface moves relative to the cylinder wall to form a coverging wedge shape that seals along its trailing edge while maintaining a fluid film to minimize wear and frictional drag. In the case of an oil control ring, the support structure may be arranged to provide better contact and oil flow control.

13 Claims, 1 Drawing Sheet

PISTON RING

This application is a continuation of application Ser. No. 07/086,873 filed Aug. 19, 1987 and now abandoned.

BACKGROUND OF THE INVENTION

This invention relates to a piston ring such as used in internal combustion engines. There are presently two general approaches to piston ring design. The first approach uses a spacer expander ring to provide a spring type force to push the sealing ring against the cylinder wall to cause sealing. A ring of this type is shown in the Hartley Pat. No. 3,608,911 and utilizes a flexible plastic support that expands outward under the pressure of combustion gases to effect sealing. In the first approach, the mechanical spring loading is continuous and creates continuous undesirable friction losses. In the Prasse et al patent, the sealing force is proportional to the amount of gas pressure being applied to the seal but does not take into account frictional drag and other hydrodynamic forces that cause increased wear, friction and reduced sealing. Additionally, all traditional rings are split to allow for installation. The split construction forms an added path for the escape of gas by the ring.

SUMMARY OF THE INVENTION

The present invention relates to a piston ring in which the sealing surface is spaced from the piston by a flexible web like structure. The web structure is arranged such that under the loading of friction and pressure, the surface member moves to form a lubricating wedge that seals along its trailing edge while maintaining a fluid film to reduce friction and wear. One of the primary objects of the present invention is to provide a piston ring that operates hydrodynamically in a bearing like fashion to provide improved sealing, reduced wear, longer life and lower friction. A second object is to provide a seal that will operate in high temperatures and/or corrosive chemical environments. A third object is to provide a piston ring which may be installed as a continuous ring to eliminate the potential escape of gasses through splits in the ring. While there are several configurations of the present invention, it is an objective that the support structure be arranged in such a way that the trailing sealing edge be capable of outward radial movement to cause improved sealing. In the case of the oil control rings, the intersection is placed at the point of contact to eliminate overturning and insure that the scraping edges travel in a path that is parallel to the cylinder wall. The dog leg ligament configuration section preloads the scraping edge against the cylinder wall.

DESCRIPTION OF THE PREFERRED EMBODIMENT

Figure 1:
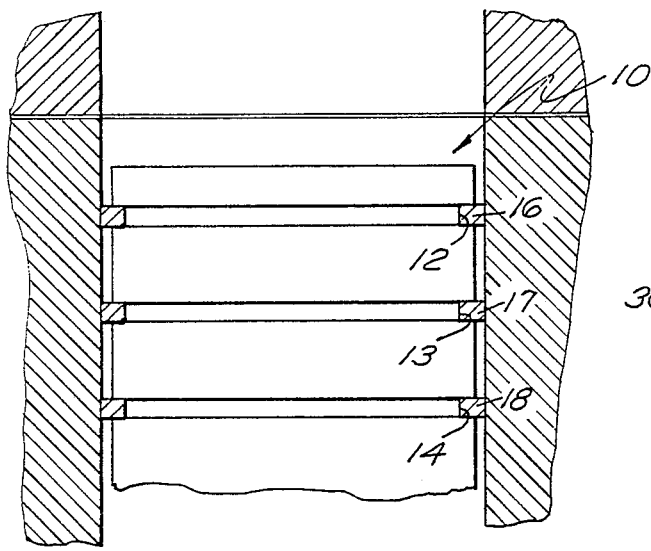
FIG. 1 is a cross section of a standard piston received in a cylinder with multiple piston rings.
Figure 2:
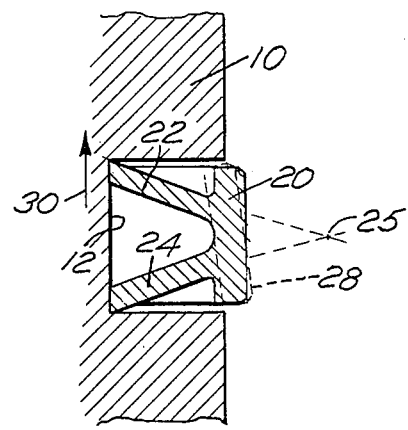
FIG. 2 is an enlarged sectional view of a piston ring of the present invention showing the ring in at rest position and deflected position.
Figure 2A:
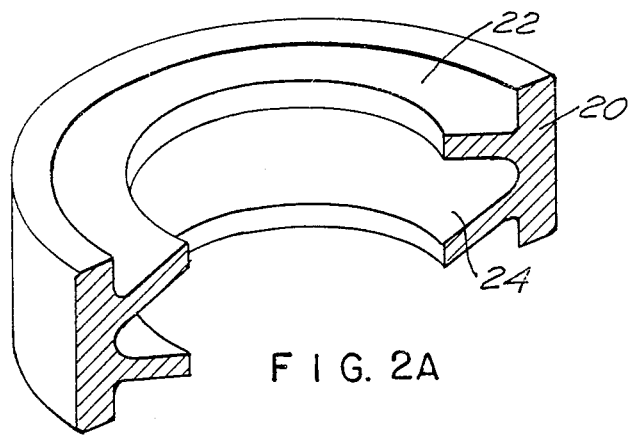
FIG. 2A is a fragmentary perspective view of the piston ring shown in FIG. 2.

Referring to the drawings and particularly to FIG. 1, there is illustrated a piston 10 of the type that is used in internal combustion engines and the like. The piston 10 is equipped with a plurality of circumferential grooves 12, 13 and 14 and each of these grooves, receives piston rings which project outwardly therefrom to provide a seal between the piston and the cylinder in which the piston is received. The rings may be of the compression type such as the rings 16 and 17 or may be oil controlled rings such as the ring 18. In the view illustrated in FIG. 2, there is seen an improved structure in accordance with the invention of a piston ring which is received in a groove such as a groove 12 and which consists of a flat cylindrical face indicated at 20 which face is supported by a pair of leg like circumferential ligaments 22 and 24. As seen in a perspective view, these legs or ligaments 22 and 24 are arranged relative to the face 20 of the ring in such a way that the intersection of the ligaments will be at a point in front of the face 20 as at 25. By virtue of this type of structure, the piston ring face will deflect upon movement such that the trailing edge as seen in broken lines at 28 will move toward the cylinder wall or outwardly as seen by the piston moves upwardly as seen by the arrow 30. In this fashion, a wedge of oil film will be formed between the face 20 and the cylinder wall, it being understood that, when the piston moves downwardly that the reverse action occurs. It should also be pointed out that the degree of deflection that is illustrated by the broken lines, is greatly magnified merely to illustrate the principle and is not to be construed as to scale whatsoever inasmuch as the movement may be no more than 0.001 inch.

Figure 3:
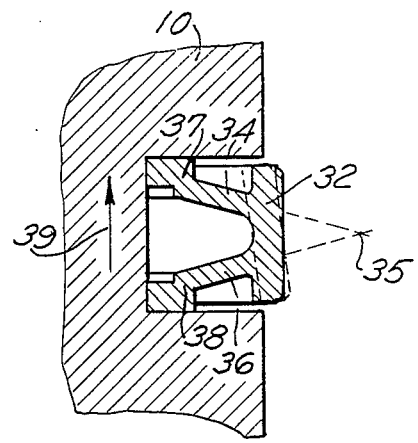
FIG. 3 is an enlarged sectional view of a piston ring of the present invention showing a dog leg in the support structure that allows a preload to be applied to the face.

Referring now to FIG. 3, there is illustrated a piston ring in which the legs or ligaments are formed in a slightly different fashion so that they effectively have a dog leg that allows a pre-load to be applied to the face. Here, the face of the piston ring 32 has the ligaments 34 and 36 that extend from the rear face thereof and which ligaments extend at an angle to the pad and to each other so that again an imaginary extension thereof will meet at a point such as 35 as seen in the drawings which is in front of the face 32. The lower part of the ligament sections have dog legs as at 37 and 38, respectively, In essence, the ring face member will similarly deflect, as in the previous embodiment, to form a wedge shape to effect hydrodynamic action that is formed with the lubricating oil.

Figure 4:
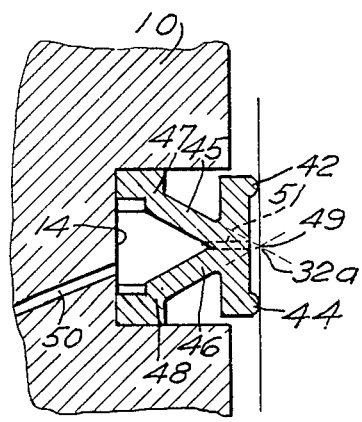
FIG. 4 is an enlarged sectional view of an oil control ring made in accordance with the present invention.

Referring now to FIG. 4, there is disclosed a further modification to the arrangement as shown in FIG. 3 where the ring face 32a has at either edge thereof, scraping edges which extend circumferentially about the face. It will be noticed that the scraping edges 42 and 44 are spaced apart; also, it will be noted that the ligaments 45 and 46 that support the ring face 32a, are arranged so that their imaginary extension intersects on the sliding surface as at 49 which eliminates any overturning and insures contact on both scraping edges. Indeed, the ligaments also have dog legs as seen in 47, 48 as seen in the previous embodiment that again allow a pre-load to be applied to the face and the scraping edges 42 and 44. Also, inasmuch as this particular piston ring structure has been designed for use as the lower or oil seal ring, an oil duct 50 may be provided to allow a passage of oil into the recess 14 of the cylinder and a further duct 51 through the pad face allows oil to be fed between the scraping edges.

Figure 5:
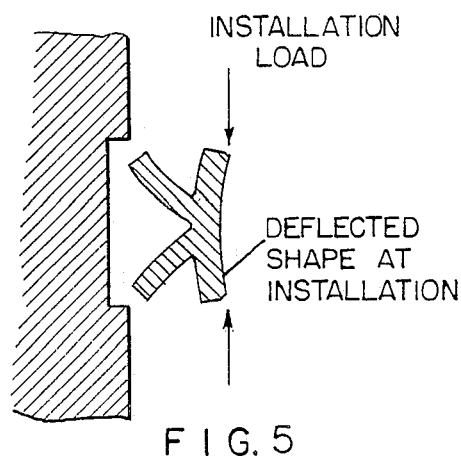
FIG. 5 is a diagramatic view illustrating with legends a compressive load applied to achieve installation.

Referring now to FIG. 5, there is illustrated the loading and deflections encountered during installation of the piston ring. For installation, the structure is oriented in such a way that when a compressive load is placed on the outside diameter of the support structure as seen by the two arrows, the support structure deflects to cause an increase in the inside diameter. While the deflections shown are for the preferred embodiment, it should be noted that various loadings and support structure design may be utilized to obtain the desired outward movement of the inside diameter for installation. It should also be appreciated that the deflections obtained are relatively small and on the order of 1 to 2mm, so it may be likewise appreciated that the ring groove is more shallow than those in use in the present state of the art.

The rings of the within described form may be made from a variety of materials, as for example steel, high temperature plastics of the polyimide or p.t.f.e. family or of a ceramic.

I claim:

1. A piston and piston ring assembly consisting of a piston movable in opposite directions in a cylinder and having at least one ring groove therein, a ring received in said groove and having an outer sealing face member extending circumferentially around said piston and spaced from said piston by a flexible web like support member, said web consisting of a pair of webs that extend at an angle to the face member defined by an imaginary point that is in front of the face member, the web structure under load allowing said sealing face member to rock to cause the trailing edge to approach an opposing surface in a sealing relationship to cause sealing and reduce friction.

2. A piston ring for a piston movable in opposite directions in a cylinder and having at least one ring groove therein, said ring having an outer face member with a plurality of spaced outer scrapping edges extending circumferentially around said face member, means spacing the ring from said piston by a flexible web-like support member that under relative motion between said piston and the opposing cylinder wall holds said scrapping edges in position to prevent overturning, said web being defined by a pair of webs that extend at an angle to the face member and which intersect at an imaginary point that is on the line between the outer extent of the scraping edges, said support structure also directing the face member into contact with the opposing cylinder wall.

3. A piston ring as in claim 2 wherein said ring is a 360° continuous ring.

4. A piston and piston ring combination comprising a piston movable in opposite directions in a cylinder and having at least one ring groove therein, a ring having a continuous outer face member with a pair of webs extending radially inward, said webs extending at an angle to the face member and intersecting at an imaginary point that is substantially at the surface of the face member, the flexible web-like support under relative motion between the piston and the cylinder holding the face member in position against the cylinder.

5. The method of assembling the ring of claim 4 into the groove consisting of applying a force at the opposite edges of the ring to deflect the web-like support and increase the inside diameter thereof.

6. A piston and piston ring assembly comprising a piston having a predetermined diameter, the piston having at least one ring groove therein; a piston ring received in the ring groove, the piston ring comprising an outer sealing face member and an outer sealing face member support structure, the outer sealing face member having a cylindrical sealing face which has a diameter greater than the predetermined diameter of the piston, the outer sealing face member being supported within the ring groove by the support structure and extending circumferentially around the piston, the support structure supporting the sealing face such that under load the sealing face member deflects so as to form a hydrodynamic wedge.

7. The piston and piston ring of claim 6, wherein the sealing face member and the support structure are unitary.

8. The piston and piston ring of claim 6, wherein the support structure comprises a plurality of frustum shaped ligaments, each frustum shaped ligament having an inner frustum periphery and an outer frustum periphery, the outer frustum periphery of each ligament being connected to the outer sealing face member.

9. The piston and piston ring of claim 8, wherein at least two of the plurality of frustum shaped ligaments are tapered away from each other such that the outer frustum peripheries of the ligaments are closer to one another than the inner frustum peripheries of the ligaments.

10. The piston and piston ring of claim 9 wherein the at least two frustum shaped ligaments converge toward a point proximate the cylindrical sealing face.

11. The piston and piston ring of claim 9 wherein the at least two frustum shaped ligaments converge toward a point radially outside the cylindrical sealing face.

12. The piston and piston ring of claim 8, wherein the support structure further comprises at least one cylindrical ligament extending from the inner conical periphery of each of the plurality of frustum shaped ligaments.

13. The piston and piston ring of claim 6 wherein the outer sealing face member includes a plurality of side edges and the support structure has an inside diameter, and the support structure being configured such that when a compressive load is placed on the side edges of the outer sealing face member, the support structure deflects to cause an increase in the inside diameter of the support structure.

* * * * *